United States Patent [19]

Sano et al.

[11] 4,265,959

[45] May 5, 1981

[54] PROCESS FOR PRODUCING SEMIPERMEABLE MEMBRANES

[75] Inventors: Takezo Sano, Takatsuki; Takatoshi Shimomura, Toyonaka; Ichiki Murase, Ibaraki; Manabu Hirakawa, Toyonaka, all of Japan

[73] Assignee: Sumitomo Chemical Company, Limited, Osaka, Japan

[21] Appl. No.: 973,633

[22] Filed: Dec. 27, 1978

[30] Foreign Application Priority Data

Dec. 28, 1977 [JP] Japan .................................. 52/159377
Jan. 21, 1978 [JP] Japan .................................... 53/5419

[51] Int. Cl.³ ..................... B32B 7/02; B01D 39/16
[52] U.S. Cl. ................................ 428/216; 210/500.2; 264/22; 264/83; 264/85; 264/49; 427/40; 428/215; 428/305; 428/398; 428/411; 428/520; 428/522; 521/27; 521/33; 525/336; 525/344
[58] Field of Search ..................... 521/27, 33; 427/40; 525/336, 344; 428/398, 215, 216, 522, 520, 411, 306; 210/500 M; 264/22, 83, 85, 49

[56] References Cited

U.S. PATENT DOCUMENTS

| | | | |
|---|---|---|---|
| 3,140,265 | 7/1964 | Richter | 521/33 |
| 3,218,301 | 11/1965 | Moody | 521/33 |
| 3,247,133 | 4/1966 | Chen | 521/33 |
| 3,297,595 | 1/1967 | Mindick | 521/33 |
| 3,320,218 | 5/1967 | Levine | 521/33 |
| 3,847,652 | 11/1974 | Hollahan | 427/40 |
| 4,147,745 | 4/1979 | Sano | 264/22 |

FOREIGN PATENT DOCUMENTS

| | | | |
|---|---|---|---|
| 47-6257 | 4/1972 | Japan. | |
| 49-43878 | 4/1974 | Japan. | |
| 1111942 | 5/1968 | United Kingdom | 521/33 |
| 1082635 | 9/1977 | United Kingdom | 521/33 |

*Primary Examiner*—Ellis P. Robinson
*Attorney, Agent, or Firm*—Steves, Davis, Miller & Mosher

[57] ABSTRACT

A method for the preparation of semipermeable membranes which comprises sulfonating porous membranes of acrylonitrile polymers containing acrylonitrile in an amount of 40% to 100% by mole.

The resulting semipermeable membrane is very useful for separating substances by reverse osmosis or ultrafiltration.

15 Claims, No Drawings

PROCESS FOR PRODUCING SEMIPERMEABLE MEMBRANES

The present invention relates to a method for the preparation of semipermeable membranes for separation of substances by sulfonating porous membranes of acrylonitrile polymers.

The semipermeable membrane now in an industrial production is a cellulose acetate membrane produced according to the method of Loeb and Sourirajan (U.S. Pat. Nos. 3,133,132 and 3,133,137) or a similar method. Although this membrane is very highly permeable to water but not to sodium chloride, it deteriorates in performance owing to the inherent susceptibility of cellulose acetate to hydrolysis. As a result, the ability to remove solutes including sodium chloride becomes poor with the lapse of time and the life of the membrane is limited.

Further, Loeb's method for the preparation of an asymmetric membrane having a skin structure requires a high-level technique and severe operation conditions. Consequently, this method is only successful in a few cases with synthetic high polymers besides cellulose acetate. This is due to the fact that it is difficult to properly select the casting solvent, additives, composition and temperature of the casting solution, atmosphere wherein evaporation of the solvent is in progress, and temperature of the atmosphere. Therefore, this method may not be said to be widely applicable.

In recent years, on the other hand, various attempts have been made to prepare a semipermeable membrane of acrylonitrile polymer which is superior to cellulose acetate in chemical, mechanical and thermal properties and in water permeability (for example Japanese Patent Publication (unexamined) Nos. 6257/1972 and 43,878/1974). These attempts are intended to form a skin layer and a supporting layer at the same time by the above described casting process, however, the resulting membrane does not have stable performance because selection of proper casting conditions is very difficult. In the case of an acrylonitrile polymer, it is said that formation of the skin layer is difficult by the casting process. And, semipermeable membranes, having not only the ability to remove low-molecular weight substances such as sodium chloride but also superior water permeability, have not yet been obtained in the casting process.

In view of the good film forming property, thermal resistance, acid resistance and alkali resistance of acrylonitrile polymers, the inventors have extensively studied to prepare semipermeable membranes capable of rejection of low-molecular weight substances by an easy method. As the results, the following important facts were suprisingly found: when a porous membrane of acrylonitrile polymer is sulfonated, the water permeability of the membrane became higher; the sulfonated membrane, has a superior ability to separate salts and low-molecular weight substances, when used as a semipermeable membrane; and the properties of the semipermeable membrane are superior to those of cellulose acetate membranes and commercial synthetic polymer membranes.

An object of the present invention is to provide a method for preparing a semipermeable membrane, having a very superior water permeability and selective permeability for substances, from a porous membrane of acrylonitrile polymer.

The acrylonitrile polymer used in the present invention is acrylonitrile homo- or co-polymer prepared by the well-known methods. As the monomers to be copolymerized with acrylonitrile, there may be exemplified the well known monomers copolymerizable with acrylonitrile, for example, a nonionic monomer (e.g. acrylamide, diacetone acrylamide, N-vinyl-2-pyrrolidone, hydroxylethyl methacrylate, methyl acrylate, ethyl acrylate, butyl acrylate, methyl methacrylate, ethyl methacrylate, vinyl acetate), an ionic monomer (e.g. acrylic acid, ethylene sulfonic acid, methacrylic acid, methallyl sulfonic acid, sulfopropyl methacrylate, vinylbenzene sulfonic acid, metal salts thereof), and cationic monomer such as tertiary amines (e.g. 2-vinylpyridine, 4-vinylpyridine, dimethylaminoethyl methacrylate) and quaternary amine salts resulting from alkylation of the tertiary amines. The acrylonitrile copolymers used herein are copolymers of acrylonitrile and one or more of the monomers.

The amount of the monomers may be optionally changed, but when the acrylonitrile content of the polymer is less than 40% by mole, the membrane made from the acrylonitrile polymer, has an extremely poor selective peameability. Consequently, the acrylonitrile polymers used in the present invention are those containing 40 to 100% by mole of acrylonitrile, particularly preferably 70 to 95% by mole. The molecular weight of the acrylonitrile polymer is not particularly limited but is preferably 5,000 to 5,000,000.

The porous membranes of acrylonitrile polymers used in the present invention include not only porous membranes made from acrylonitrile polymer by various methods but also modified porous membranes prepared by plasma treatment thereof. The porous membranes are not particularly limited in the method for the preparation thereof, but particularly preferred ones are porous membranes prepared by the conventional casting process comprising solvent evaporation and gelation, or surface plasma-treated membranes thereof.

The porous membrane may be used in various forms. Specially the membranes may have a form of fiber, hollow fiber or tube in addition to flat membrane or may be the composite with other porous supports. The membranes are used practically as a module having a suitable structure after sulfonation.

The usual casting process for the preparation of a porous membrane of acrylonitrile polymers is as follows. First, an acrylonitrile polymer is dissolved in a solvent so that the concentration thereof is 5 to 30% by weight. The solvent used is an aqueous solution containing an inorganic salt or an organic polar solvent such as dimethylacetamide, dimethylformamide or dimethyl sulfoxide.

The polymer solution obtained is cast on a substrate for example glass plate with a doctor knife. The thickness of the cast solution is related to the thickness the semipermeable membrane. Consequently, the thickness of the solution on the substrate is generally controlled so as to form a semipermeable membrane having a thickness of about 20 to 500$\mu$. The coated substrate is dipped in a non-solvent immediately after the casting or after the solvent of the solution is evaporated for some time.

In general, the period of time during which the solvent is evaporated is preferably 0 to 60 minutes and the evaporation is preferably carried out at a temperature between 0° C. and the boiling point of the solvent. Thereafter, the coated substrate, from which the solvent may partially be evaporated or may not be evaporated, is dipped in a non-solvent. As the non-solvent, there may be used water or a mixture of water and an organic solvent. The organic solvent used herein is a water-soluble one and preferably the same solvent that is used for the preparation of said polymer solution.

In the preparation of this porous membrane, various operation conditions, for example polymer concentration, casting temperature, evaporation time and gelation temperature, have, of course, an influence on the performance of the final product to some extent, but the conditions are not decisive.

The porous membrane thus obtained can be utilized according to the present method, if the membrane has a water permeability of 0.01 to 1,000 LMH (l/m$^2$.hr) (under a pressure of 10 kg/cm$^2$) and a bubble point (The value of air pressure (kg/cm$^2$) under which the air may be pressed out through the pores of membrane which has been throughly wetted with water.) of 1 kg/cm$^2$ or more in the wet state of the membrane, in other words, if the membrane is free from defects. Further, in the present invention, modified porous membranes, prepared by plasma-treatment of the porous membranes described above, can be used. For example the plasma-treatment can be carried out by the method disclosed in Japan Patent Publication (unexamined) No. 26380/77. That is, the plasma refers to one generated by glow discharge, corona discharge or the like. For example the plasma by glow discharge is generated by introducing a gas (e.g. hydrogen, helium, argon, nitrogen, oxygen, carbon monoxide, carbon dioxide, ammonia, water) into a vacuum vessel through a cock so that the pressure in the vessel becomes 0.01 to 10 Torr, and applying an alternating current or direct current voltage of 0.5 to 50 kV between electrodes. Further, a plasma is produced by generating corona discharge in the atmosphere or in an inert gas with a direct current of 0.1 to 1.3 A at 1 kV.

The plasma treated modified porous membrane can be obtained by placing the dried porous membrane made from acrylonitrile polymers in the plasma atmosphere described above to expose the porous membrane to the plasma. Usually, the exposure time is 0.5 to 120 minutes, preferably 5 to 120 minutes, but is not limited thereto.

In the present invention, when the plasma-treated porous membrane is used, a semipermeable membrane having a more superior separation property and water permeability, due to a synergistic effect of the plasma-treatment and sulfonation, can be obtained.

In the present invention, as a sulfonating agent, there may be used various known compounds. Of these, sulfuric anhydride is the most preferred, considering the facility for the sulfonation reaction. When sulfuric anhydride is used, the treatment method is as follow. That is, the porous membrane is merely placed in an atmosphere of gaseous sulfuric anhydride or a gaseous mixture of gaseous sulfuric anhydride with an other gas to contact the membrane with sulfuric anhydride. In this case, as a gas mixed with sulfuric anhydride, there may be used any gas inert to sulfuric anhydride such as air, nitrogen, helium and the like. Usually, the treating temperature is 0° to 80° C., but is not limited thereto. And, the sulfonation is carried out under a pressure at which sulfuric anhydride keeps a gaseous state. Desirably, it is carried out at an ordinary pressure in the operational aspect. In this treatment, both surfaces or only one surface of the porous membrane may be contacted with a sulfonating agent, but it is desirable to contact only one surface of the membrane with sulfuric anhydride without sulfonating the whole membrane, because, the porous membrane obtained becomes somewhat brittle when the whole membrane is sulfonated.

The separation property of the semipermeable membranes of the present invention is determined by controlling various factors, among which the concentration of sulfonating agent and sulfonation time are important. By varying these two factors, it is possible to control the degree of sulfonation at the membrane surface and thereby to obtain a membrane having a desired separation property. In the sulfonation, the concentration of sulfonating agent and sulfonation time can be varied from 0.01 to 100% by mole and from 1 second to 60 minutes, respectively. However, it is preferable to control these two factors so that the sulfur content of sulfonated membrane is from 0.01 to 5% by weight. When the sulfur content of the membrane is less than 0.01% by weight, the effect of sulfonation is too small. On the other hand, when the content of the membrane is more than 5% by weight, the membrane obtained has an inferior mechanical strength and becomes unusable in practice. The ion exchange ability of the porous membrane is given by the sulfonation. The suitable ion exchange capacity of the sulfonated porous membrane is from 0.001 to 1.2 meq/g.

As described above, the method of the present invention is characterized by easily making membrane materials hydrophilic and making membranes dense owing to crosslinking thereof by sulfonation while keeping the original form of the porous membrane before the treatment (sulfonation and plasma-treatment) by making the most of a reactivity of acrylonitrile polymers with sulfonating agents. According to this technique, it is possible to prepare easily semipermeable membranes having optional cut-off properties from low-molecular weight substances such as sodium chloride to high polymers having molecular weight of 1,000,000.

The semipermeable membrane of the present invention has a thickness of 20 to 500μ and comprises a surface dense layer, in which pores cannot be observed by an electron microscope, having a thickness of less than 1μ, and a porous layer continued to said surface layer. The pores of 100 to 1000 Å in size are present in said porous layer close to said surface layer, and the size of the pores increases gradually to 1 to 100μ towards the back surface of the membrane. The thickness of crosslinked part of the membrane can be optionally controlled from 0.1μ to the thickness of the membrane, but the structure described above is not changed depending upon the thickness of the crosslinked part.

A feature of the present semipermeable membrane is that the membrane is much superior to the conventional cellulose acetate membranes in chemical, mechanical and thermal properties and has the ability to separate substances when used in reverse osmosis and the like.

In other words, the semipermeable membrane of the present invention is sufficiently usable in pH range as wide as 1 to 12 and at the highest temperature of 50° C.

Consequently, the acrylonitrile polymer semipermeable membrane obtained by sulfonation of the present invention is widely used for separating or concentrating substances by reverse osmosis, ultrafiltration or the like. More specifically, it is used for the preparation of fresh water from sea water, waste water treatment, concentration of fruit juices and the like. Further, the present semipermeable membrane is insoluble in many organic solvents so that it is widely applicable to separation of nonaqueous fluids.

The present invention will be illustrated more specifically with reference to the following examples, which are not however intended to limit the invention thereto.

The solute rejection is defined by the following equation:

$$\text{Solute rejection (\%)} = \left(1 - \frac{\text{the concentration of solute in permeated solution}}{\text{the concentration of solute in feed solution}}\right) \times 100$$

EXAMPLE 1

A copolymer comprising 89% by mole of acrylonitrile and 11% by mole of methyl acrylate was prepared by the well-known method. Twenty parts of the copolymer were dissolved in a mixed solvent of 70 parts of dimethyl formamide and 10 parts of formamide. The resulting solution was cast on a glass plate kept at 40° C. so that the thickness of the solution became 250μ. After 1 minute's evaporation, the glass plate was immersed in water at 16° to 17° C. to carry out gelation of the solution.

After 2 hours, the resulting membrane was removed from the glass plate and was tested, as it was, for water permeability under a pressure of 10 kg/cm². As the results, the water permeability was 148 LMH (l/m².hr), and the bubble point was 12 kg/cm².

Next, the wet membrane was dried for 24 hours, at room temperature. The sulfonation of the membrane was carried out for 20 minutes at room temperature by contacting only one surface of the dry membrane with a gas mixture of 3% by volume of sulfuric anhydride and 97% by volume of nitrogen under one atmosphere pressure. After sulfonation, a part of the membrane was subjected to elementary analysis to measure the content of sulfur in the membrane. The sulfur content was 0.60% by weight. As a result of the measurement of ion exchange capacity of sulfonated membrane, the membrane had an ion exchange capacity of 0.1 meq/g. Accordingly, the introduction of sulfonate groups into the membrane was found.

By electron microscopic observation, it was found that this membrane was asymmetric one composed of a dense layer on which pores were not observable there and a layer having pores from 300 Å to 20μ in size therein continued to said dense layer.

When the semipermeable membrane was dissolved with dimethyl formamide, an insoluble thin film having a thickness of 20μ was obtained. As the result, it was found that said thin film was crosslinked.

Next, the sulfonated membrane was mounted on a continuous reverse osmosis apparatus (effective area of membrane 13 cm²) usually used in a laboratory and tested for saline water permeability (sodium chloride concentration 0.50% by weight).

Experimental conditions:
Pressure 50 kg/cm²
Temperature of saline water 25° C.
Feed rate of saline water 630 ml/min
Experimental results (performance of semipermeable membrane):
Amount of permeated water 41.3 LMH
Salt rejection 94.8%

The dry membrane before sulfonation was likewise tested. As the results, the amount of permeated water was 6.2 LMH and the membrane showed no ability to remove sodium chloride.

EXAMPLE 2

The membrane treated with sulfuric anhydride in Example 1 was tested for thermal stability in the same manner as in Example 1 except changing the temperature of saline water 40° to 50° C.

The results are as follows:

| Temperature of saline water | Amount of permeated water | Salt rejection |
| --- | --- | --- |
| 40° C. | 49.7 LMH | 94.2% |
| 50° C. | 54.0 LMH | 93.0% |

EXAMPLE 3

A copolymer comprising 90% by mole of acrylonitrile and 10% by mole of vinyl acetate was prepared by the well-known method. Sixteen parts of the copolymer were dissolved in a mixed solvent of 74 parts of dimethylformamide and 10 parts of formamide. The resulting solution was cast on a glass plate kept at 40° C. so that the thickness of the solution became 250μ. After 1 minute's evaporation, the glass plate was immersed in water at 16° to 17° C. to carry out gelation of the solution.

After 2 hours, the resulting membrane was removed from the glass plate and was tested, as it is was, for water permeability under a pressure of 10 kg/cm². As the results, the water permeability was 170 LMH and the bubble point was 4 kg/cm².

Next, the wet membrane was dried for 24 hrs. at room temperature.

The sulfuric anhydride-treatment of the dry membrane was carried out for 5 minutes at room temperature by placing the dry membrane in an atmosphere of a gaseous mixture of 2% by mole of sulfuric anhydride and 98% by mole of nitrogen under atmospheric pressure.

After the treatment, this membrane was mounted on a continuous ultrafiltration apparatus (effective area of membrane 13 cm²) usually used in a laboratory and tested for ultrafiltration performance. The conditions and results of the experiments were as follows.

Experimental conditions:
Pressure 2 kg/cm²
Solution temperature 25° C.
Solute concentration 1% for every solution
Feed rate 630 ml/min
Experimental results:

| Solute | Molecular weight | Amount of permeated water (LMH) | Rejection (%) |
| --- | --- | --- | --- |
| Sodium chloride | 58 | 28.3 | 5.1 |
| Sucrose | 342 | 23.0 | 28.4 |
| Amaranth | 604 | 24.5 | 41.5 |
| Polyethylene glycol | 2000 | 18.9 | 88.7 |
| Polyethylene glycol | 20000 | 12.4 | 100 |

The dry membrane before sulfuric anhydride-treatment was likewise tested.

As the results, the amount of permeated water was 7.3 LMH and the membrane showed no ability to remove each solute.

EXAMPLE 4

A plasma-treated membrane was prepared by plasma-treatment of the dry membranes obtained in Example 1 using a plasma-treatment apparatus equipped with a glass vessel and a pair of electrodes therein.

Plasma-treatment conditions were as follows.
Gas: Helium
Pressure: 0.2 Torr
Discharge voltage: 3.0 kV
Discharge current: 25 mA
Treatment time: 40 minutes Next, a part of the plasma-treated membrane was subjected to sulfonation by placing it in an atmosphere of a gas mixture of 3% by volume of sulfuric anhydride with 97% by volume of nitrogen at room temperature and under atmospheric pressure. A part of the resulting membrane was subjected to elementary analysis to measure sulfur content in the membrane. The sulfur content was 0.57% by weight. And, as a result of measurement of ion exchange capacity of the sulfonated membrane the membrane had an ion exchange capacity of 0.16 meq/g. Accordingly, the introduction of sulfonate groups into the membrane was found.

Next, the plasma-treated membrane and the membrane sulfonated after plasma-treatment were tested for permeability in the same manner as in Example 1. The results are as follows.

| Plasma-treated membrane | Water permeability 14.2 LMH Salt rejection 97.6% |
|---|---|
| Membrane sulfonated after plasma-treatment | Water permeability 31.5 LMH Salt rejection 98.9% |

It appeared that both water permeability and salt rejection ability of the membrane were remarkably improved by sulfonation of the plasma-treated membrane.

EXAMPLE 5

A copolymer of 90% by mole of acrylonitrile and 10% by mole of vinyl acetate was prepared by the well-known method. Twenty one parts of the copolymer were dissolved in a mixed solvent of 69 parts of dimethylformamide and 10 parts of formamide. The resulting solution was cast on a glass plate kept at 40° C. so that the thickness of the solution became 250μ. After 1 minute's evaporation, the glass plate was immersed in water at 16° to 17° C. to carry out gelation of the solution.

After 2 hours, the resulting membrane was removed from the glass plate and was tested, as it was, for water permeability under a pressure of 10 kg/cm². As the results, the water permeability and bubble point were 104 LMH and 16 kg/cm², respectively.

Next, after the membrane was dried for 24 hours at room temperature, a plasma-treated membrane was prepared by plasma-treatment of the dry membrane using the plasma-treatment apparatus of Example 1.

Plasma-treatment conditions are as follows.
Gas: Helium
Pressure: 0.1 Torr
Discharge voltage: 3.0 kV
Discharge current: 30 mA
Treatment time: 40 minutes Next, a part of the plasma-treated membrane was subject to sulfonation by placing it in an atmosphere of a gaseous mixture of 5% by volume of sulfuric anhydride with 95% by volume of nitrogen at room temperature and under atmospheric pressure.

The plasma-treated membrane and the membrane sulfonated after plasma-treating were tested for permeability in the same manner as in Example 1. The results are as follows.

| Plasma-treated membrane | Water permeability 12.3 LMH Salt rejection 98.2% |
|---|---|
| Membrane sulfonated after plasma-treatment | Water permeability 28.6 LMH Salt rejection 99.22% |

What is claimed is:

1. A method for the preparation of a semipermeable heterogeneous membrane having high water permeability and the ability to reject low-molecular weight materials which comprises sulfonating a porous membrane of an acrylonitrile polymer having a molecular weight of 5,000 to 5,000,000 and containing acrylonitrile in an amount of 40 to 100% by mole, wherein said porous membrane has a bubble point of more than 1 kg/cm² and a water permeability of 0.01 to 1000 LMH under a pressure of 10 kg/cm².

2. A method according to claim 1, wherein said porous membrane is a surface plasma-treated membrane of a porous membrane having a bubble point of more than 1 kg/cm² and a water permeability of 0.01 to 1000 LMH under a pressure of 10 kg/cm².

3. A method according to claim 2, wherein said surface plasma-treated membrane is obtained by exposing a porous membrane to a plasma generated by a glow discharge voltage of 0.5 to 50 kV under a pressure of 0.01 to 10 torr.

4. A method according to claim 1, wherein said acrylonitrile polymer is polyacrylonitrile or a copolymer of acrylonitrile and a monomer selected from the group consisting of acrylamide, diacetone acrylamide, N-vinyl-2-pyrrolidone, hydroxyethyl methacrylate, methyl acrylate, ethyl acrylate, butyl acrylate, methyl methacrylate, ethyl methacrylate, vinyl acetate, acrylic acid, ethylene sulfonic acid, methacrylic acid, methallyl sulfonic acid, sulfopropyl methacrylate, vinylbenzene sulfonic acid, metal salts thereof, tertiary amines such as 2-vinylpyridine, 4-vinylpyridine and dimethylaminoethyl methacrylate and quarternary amine salts resulting from alkylation of the tertiary amines.

5. A method according to claim 1, wherein said polymer contains acrylonitrile in an amount of 70 to 95% by mole.

6. A method according to claim 1, wherein the sulfonation is carried out with sulfuric anhydride.

7. A method according to claim 6, wherein said sulfuric anhydride is gaseous or a gaseous mixture of an inert gas therewith.

8. A method according to claim 7, wherein said inert gas is air, nitrogen or helium.

9. A method according to claim 7, wherein the concentration of sulfuric anhydride is 0.01 to 100% by volume.

10. A method according to claim 6, wherein the sulfonation time is one second to 60 minutes.

11. A method according to claim 1, wherein said sulfonation is carried out on only one surface of the porous membrane.

12. A heterogeneous semipermeable membrane having high water permeability and the ability to reject low-molecular weight materials comprising an acrylonitrile polymer membrane which has a thickness of 20 to 500μ, a surface dense layer of less than 1μ in thickness at the surface and pores increasing in size gradually towards the back surface of the membrane and is crosslinked by sulfonation more than 0.1μ in thickness from the surface, said acrylonitrile polymer containing 40 to 100% by mole of acrylonitrile and having a molecular weight of 5,000 to 5,000,000.

13. A heterogeneous membrane according to claim 12, wherein said acrylonitrile polymer is polyacrylonitrile or a copolymer of acrylonitrile and a monomer selected from the group consisting of acrylamide, diacetone acrylamide, N-vinyl-2-pyrrolidone, hydroxylethyl methacrylate, methyl acrylate, ethyl acrylate, butyl acrylate, methyl methacrylate, ethyl methacrylate, vinyl acetate, ionic monomers such as acrylic acid, ethylene sulfonic acid, methacrylic acid, methallyl sulfonic acid, sulfopropyl methacrylate, vinylbenzene sulfonic acid and metal salts thereof, tertiary amines such as 2-vinylpyridine, 4-vinylpyridine and methylaminoethyl methacrylate, and quaternary amine salts resulting from alkylation of the tertiary amines.

14. A heterogeneous membrane according to claim 12 which has pores of 100 to 1,000 Å in size in the layer close to said dense layer, the size of the pores increasing gradually to 1 to 100μ towards the back surface of the membrane.

15. A heterogeneous membrane according to claim 12 which is applicable to separation and concentration of substances by reverse osmosis or ultrafiltration.

* * * * *